(12) United States Patent
Goldman et al.

(10) Patent No.: US 8,204,179 B2
(45) Date of Patent: Jun. 19, 2012

(54) TELECOMMUNICATION RELAY SERVICE ASSISTANCE FOR INCOMING CALLS

(75) Inventors: Stuart O. Goldman, Scottsdale, AZ (US); Mark Walter, Aurora, IL (US)

(73) Assignee: Alcatel Lucent, Paris (FR)

( * ) Notice: Subject to any disclaimer, the term of this patent is extended or adjusted under 35 U.S.C. 154(b) by 1099 days.

(21) Appl. No.: 12/104,202

(22) Filed: Apr. 16, 2008

(65) Prior Publication Data

US 2009/0262906 A1 Oct. 22, 2009

(51) Int. Cl.
*H04M 11/00* (2006.01)
(52) U.S. Cl. ......................................... 379/52
(58) Field of Classification Search .................... 379/52
See application file for complete search history.

(56) References Cited

U.S. PATENT DOCUMENTS

| | | |
|---|---|---|
| 6,560,317 B1 | 5/2003 | Quagliana |
| 6,914,964 B1 | 7/2005 | Levine |
| 2005/0232169 A1 | 10/2005 | McLaughlin et al. |

FOREIGN PATENT DOCUMENTS

EP 0773659 A2 5/1997

OTHER PUBLICATIONS

International Search Report for PCT/US2009/001748 (3 pages).
Written Opinion of the International Searching Authority for PCT/US2009/001748 (6 pages).

*Primary Examiner* — Alexander Jamal
(74) *Attorney, Agent, or Firm* — Fay Sharpe LLP

(57) ABSTRACT

A method is provided in a telecommunications network for clandestinely providing a transmission relay service (TRS) to a called party (30). The method includes: receiving a first call from a calling party (10), the first call being received at a network node (40) serving a called party (30) for which the first call is intended; detecting the called party (30) answering the first call; and, determining whether or not to invoke a feature (44) supported by the network node (40). If it is determined that the feature (44) is to be invoked, then the method further includes: reserving a bridge; placing a second call to a relay center (50) supporting the TRS; obtaining an acknowledgement from the relay center (50) that an operator (52) at the relay center (50) is ready to participate in the first call; and, in response to obtaining the acknowledgement, completing the reserved bridge between the calling party (10) and the relay center (50), and establishing a TRS link between the relay center (50) and the called party (30).

20 Claims, 2 Drawing Sheets

TELECOMMUNICATION RELAY SERVICE ASSISTANCE FOR INCOMING CALLS

FIELD

The present inventive subject matter relates to the telecommunication arts. Particular application is found in conjunction with certain types of telecommunications relay service (TRS) and/or particular telecommunication networks, and the specification makes particular reference thereto. However, it is to be appreciated that aspects of the present inventive subject matter are also amenable to other like applications and/or networks.

BACKGROUND

As is generally known in the art, a Telecommunications Relay Service (TRS) is a telephone service that allows a person with a hearing and/or speech impairment to place and/or receive telephone calls. A TRS will typically use an operator (referred to herein as a CA or communications assistant) situated at a relay center to facilitate telephone calls between hearing and/or speech impaired individuals and other call participants. In practice, a TRS call may be initiated by either the person with the hearing and/or speech impairment, or by the other individual or party to the call (e.g., a non-impaired individual). When a person with a hearing and/or speech impairment initiates a TRS call, that person often may use a TTY (i.e., a teletype or teletypewriter or text telephone—also referred to sometimes as a TTD or Telecommunications Device for the Deaf) or other text input device to call the TRS relay center, and gives a CA at the center the number of the party that he or she wants to call. The CA in turn places an outbound traditional voice call to the specified person. The CA then serves as a link or intermediary for the call, relaying the text of the calling party in voice to the called party, and converting to text what the called party voices back to the calling party. Alternately, when the other party (i.e., the non-impaired individual) wishes to call a hearing and/or speech impaired individual, the calling party initiates the call by calling the TRS relay center, e.g., usually by dialing or otherwise calling a toll-free or other designated number. The calling party then provides the CA with the telephone number or other like address of the hearing and/or speech impaired individual they wish to contact, and the CA places a corresponding call to the specified number or address. Again, the CA serves as a link for the call—translating and/or converting text to voice and vice versa as the case may be for communications between the parties.

Video Relay Service (VRS) is a particular form of TRS that allows persons with hearing and/or speech impairments who use American Sign Language (ASL) or other form of manual communication to communicate with voice telephone users through video equipment, rather than through typed text. Typically, video equipment links the VRS user with a TRS operator or CA so that the VRS user and the CA can see and communicate with each other in signed or other similar conversation. Because the conversation between the VRS user and the CA can flow much more quickly as compared to a text-based TRS calls, VRS has become a popular form of TRS.

Generally, VRS (like other forms of TRS) allows persons who are hearing and/or speech impaired to communicate through the telephone system with other persons, e.g., that may not be so impaired. The VRS caller, using a television or a computer with a video camera device and a broadband or high speed Internet connection, contacts a VRS CA, who is a qualified sign language interpreter. For example, the hearing and/or speech impaired individual may uses a videophone or other video device, such as a webcam, to connect via broadband Internet to the VRS. In any event, the impaired caller and CA are free to communicate with each other in sign language or the like through the established video link. The VRS CA then places a traditional voice telephone call to the party that the VRS user wishes to call. Once the traditional voice leg of the call has also been established, the VRS CA relays the conversation back and forth between the parties, e.g., in sign language with the VRS user, and by voice with the called party. Alternately, a voice telephone user can also initiate a VRS call by calling a VRS center, usually through a toll-free or other designated number. As with the text based TRS, the calling party then provides the CA with the number or other like address of the hearing and/or speech impaired individual they wish to contact, and the CA attempts to establish a corresponding video link to the specified number or address. Again, once the hearing and/or speech impaired party is connected, the CA serves as an intermediary for the call—translating and/or converting sign language to voice and vice versa as the case may be for communications between the parties.

While generally helpful, traditional VRS and/or TRS have some drawbacks and/or limitations. For example, the impaired individual and/or other call participant may feel apprehensive or uncomfortable if the other call participant knows a third party (i.e., the CA) is privy to the conversation. Accordingly, one solution to this problem is to use what is known as Voice Carry Over (VCO).

When VCO is implemented in a VRS and/or TRS call, the impaired individual is allowed to use their own voice in the communication with the other call participant. In particular, VCO is a type of TRS that allows a person, e.g., with a hearing impairment, but who wants to use his or her own voice, to speak directly to the other call participant and receive responses in text and/or sign language from the CA. For example, this type of service is particularly useful to individuals who may have impaired hearing, but who can still speak adequately. Accordingly, when the VCO user initiates a call to the relay center, the caller may inform the CA not to alert the other call participant (i.e., the called party) to the presence of the CA, and because VCO is being used, when the call is established with the other call participant, the called party will only hear the voice of the caller (not the CA), while response and/or other communications from the called party to the caller are relayed by the CA to the caller in sign language or text. In this manner, any potential "uneasiness" is alleviated insomuch as the called party remains unaware that the CA is privy to the conversation.

However, VCO is generally only an adequate solution when the impaired individual initiates the call. This is because when the non-impaired individual or voice telephone user initiates the call, generally they place a call to the relay center by dialing or otherwise calling a toll-free or other designated number and then providing the CA with the number or address of the impaired person they wish to contact. Accordingly, the calling party in this instance is likely to be well aware of the CA's involvement in the call, even if VCO is ultimately employed by the called party.

Accordingly, a new and improved system and/or method for providing VRS and/or TRS in a telecommunications network is disclosed that overcomes the above-referenced problems and others.

SUMMARY

In accordance with one embodiment, a method is provided in a telecommunications network for clandestinely providing a transmission relay service (TRS) to a called party. The method includes: receiving a first call from a calling party, the first call being received at a network node serving a called party for which the first call is intended; detecting the called party answering the first call; and, determining whether or not to invoke a feature supported by the network node. If it is determined that the feature is to be invoked, then the method further includes: reserving a bridge; placing a second call to a relay center supporting the TRS; obtaining an acknowledgement from the relay center that an operator at the relay center is ready to participate in the first call; and, in response to obtaining the acknowledgement, completing the reserved bridge between the calling party and the relay center, and establishing a TRS link between the relay center and the called party.

In accordance with another embodiment, a system is provided in a telecommunications network for clandestinely providing a transmission relay service (TRS) to a called party. The system includes: means for receiving a first call from a calling party, the first call being received at a network node serving a called party for which the first call is intended; means for detecting the called party answering the first call; means for determining whether or not to invoke a feature supported by the network node; means for reserving a bridge; means for placing a second call to a relay center supporting the TRS; means for obtaining an acknowledgement from the relay center that an operator at the relay center is ready to participate in the first call; means for completing the reserved bridge between the calling party and the relay center; and, means for establishing a TRS link between the relay center and the called party.

Numerous advantages and benefits of the inventive subject matter disclosed herein will become apparent to those of ordinary skill in the art upon reading and understanding the present specification.

BRIEF DESCRIPTION OF THE DRAWINGS

The inventive subject matter may take form in various components and arrangements of components, and in various steps and arrangements of steps. The drawings are only for purposes of illustrating preferred embodiments and are not to be construed as limiting. Further, it is to be appreciated that the drawings are not to scale.

DETAILED DESCRIPTION OF PREFERRED EMBODIMENTS

For clarity and simplicity, the present specification shall refer to structural and/or functional elements, entities and/or facilities, relevant communication standards, protocols and/or services, and other components that are commonly known in the telecommunications and/or networking arts without further detailed explanation as to their configuration or operation except to the extent they have been modified or altered in accordance with and/or to accommodate the preferred embodiment(s) presented herein.

Figure 1:
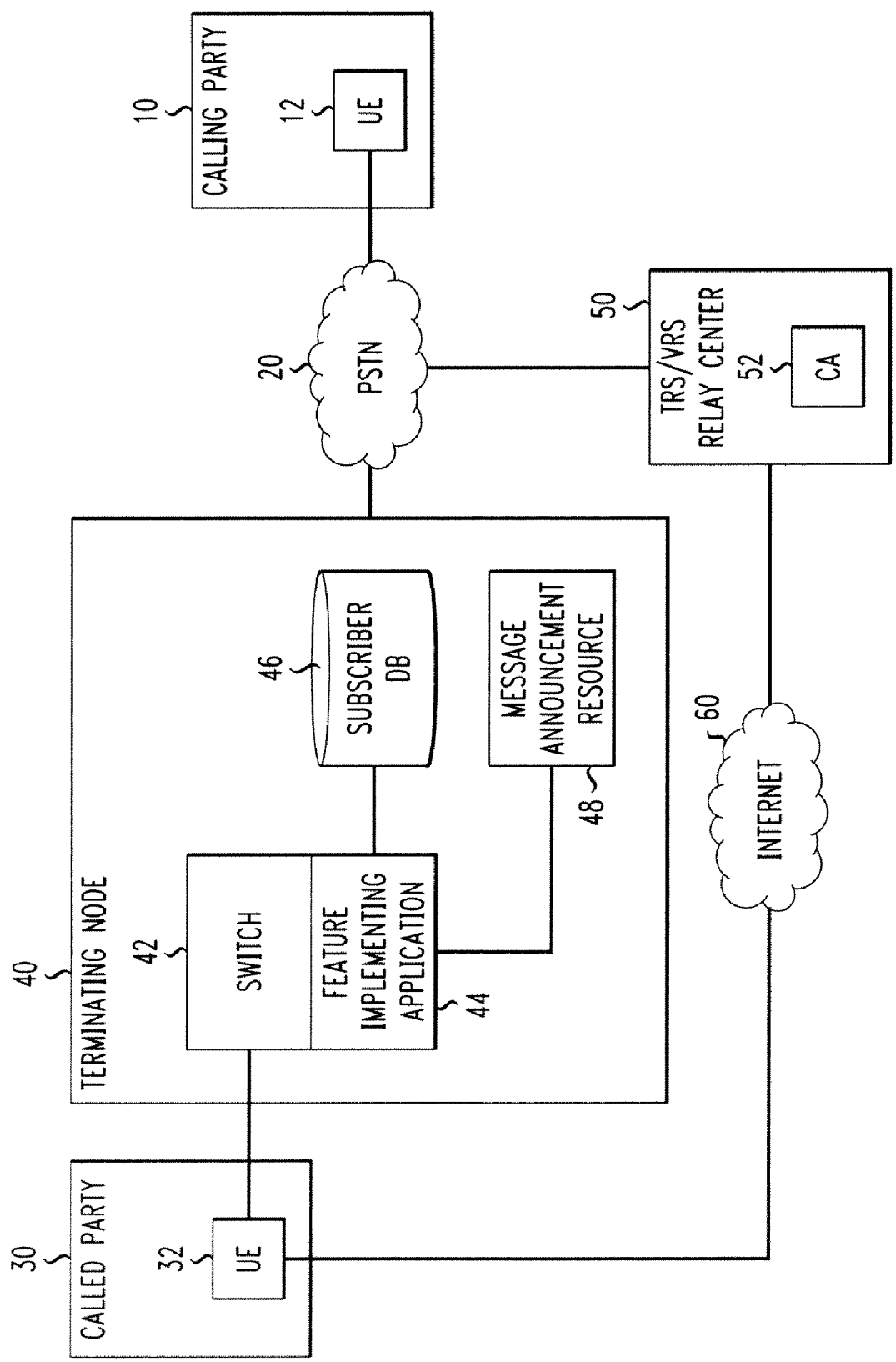
FIG. 1 is box diagram showing an exemplary telecommunications network suitable for practicing aspects of the present inventive subject matter.

With reference to FIG. 1, there is shown an individual or calling party 10 that has access to end user equipment (UE) 12 which is operatively connected in the usual manner to a telecommunications network 20, e.g., a Public Switched Telephone Network (PSTN), a wireless or cellular network, an Internet Protocol (IP) or Voice over IP (VoIP) network, or some combination thereof. In practice, the UE 12 is optionally a voice telephone or other like end user telecommunications device that the calling party 10 employs to selectively place calls over the network 20, e.g., via an end office or originating node (not shown) that provides the UE 12 access to the network 20.

Also shown is an individual or called party 30 (e.g., a hearing and/or speech impaired individual) that has access to end user equipment (UE) 32 which is also operatively connected to the network 20 in the usual manner. More specifically, the called party 30 is provided access to the network 20 via an end office or terminating node 40. For example, in the illustrated embodiment, the end office or terminating node 40 is equipped with a telecommunications switch 42 to which the UE 32 is operatively connected in the usual manner. Optionally, the switch 42 may be a class 5 telecommunications switch (such as the 5ESS available from Alcatel-Lucent) or some other application appropriate telecommunications switch or network access device which is operatively connected to the network 20 in the usual manner.

Suitably, the UE 32 includes a voice telephone or is otherwise equipped and/or provisioned with voice telephone features, capabilities and/or amenities. Additionally, UE 32 suitably includes appropriate equipment and/or provisioning that provides the called party 30 access to a TRS and/or VRS supported by a relay center 50 that is optionally manned by one or more operators or CAs, such as the exemplary CA 52 shown in FIG. 1. More specifically, in an exemplary embodiment, the UE 32 may optionally include: a TTY or the like that supports text-based TRS access to the relay center 50 by the called party 30, and/or suitable video equipment (e.g., such as a video camera, webcam or other like video input device and/or a monitor, television or other video display or suitable video output device) that supports a video link between the relay center 50 and the called party 30. For example, the UE 32 may include a videophone or otherwise be equipped and/or provisioned with videophone features, capabilities and/or amenities. Optionally, a video link is selectively established between the UE 32 and the relay center 50 in the usual manner via a broadband, high-speed or other appropriate connection over a data or packet switched network (e.g., such as the Internet 60) or another suitable network. In practice, the UE 32 may be a single unitary piece of equipment or alternately a plurality of pieces of equipment acting in concert to achieve the desired functions and/or results.

For the purposes of simplicity and/or clarity herein, only a single calling party 10 and a single called party 30 have been illustrated. However, it is to be appreciated that in practice, typically, a plurality of similar parties are likewise arranged and/or served by the network 20.

Generally, the present inventive subject matter relates to a telecommunications service and/or feature (indicated generally by reference numeral 44 in FIG. 1) whereby the called party 30 is able to benefit from the aid of a TRS (or more specifically a VRS) utilizing VCO without the calling party 10 being alerted to the participation of the operator or CA 52 at the relay center 50. That is to say, the feature 44 allows the called party 30 to clandestinely access and/or utilize telecommunications and/or video relay services with VCO for incoming calls. In the illustrated embodiment, the feature 44 is implemented as an application administered from and/or supported at the terminating node 40, e.g., by the switch 42. Alternately, however, the feature 44 may be implemented, supported in and/or administered from elsewhere in the network 20.

Figure 2:
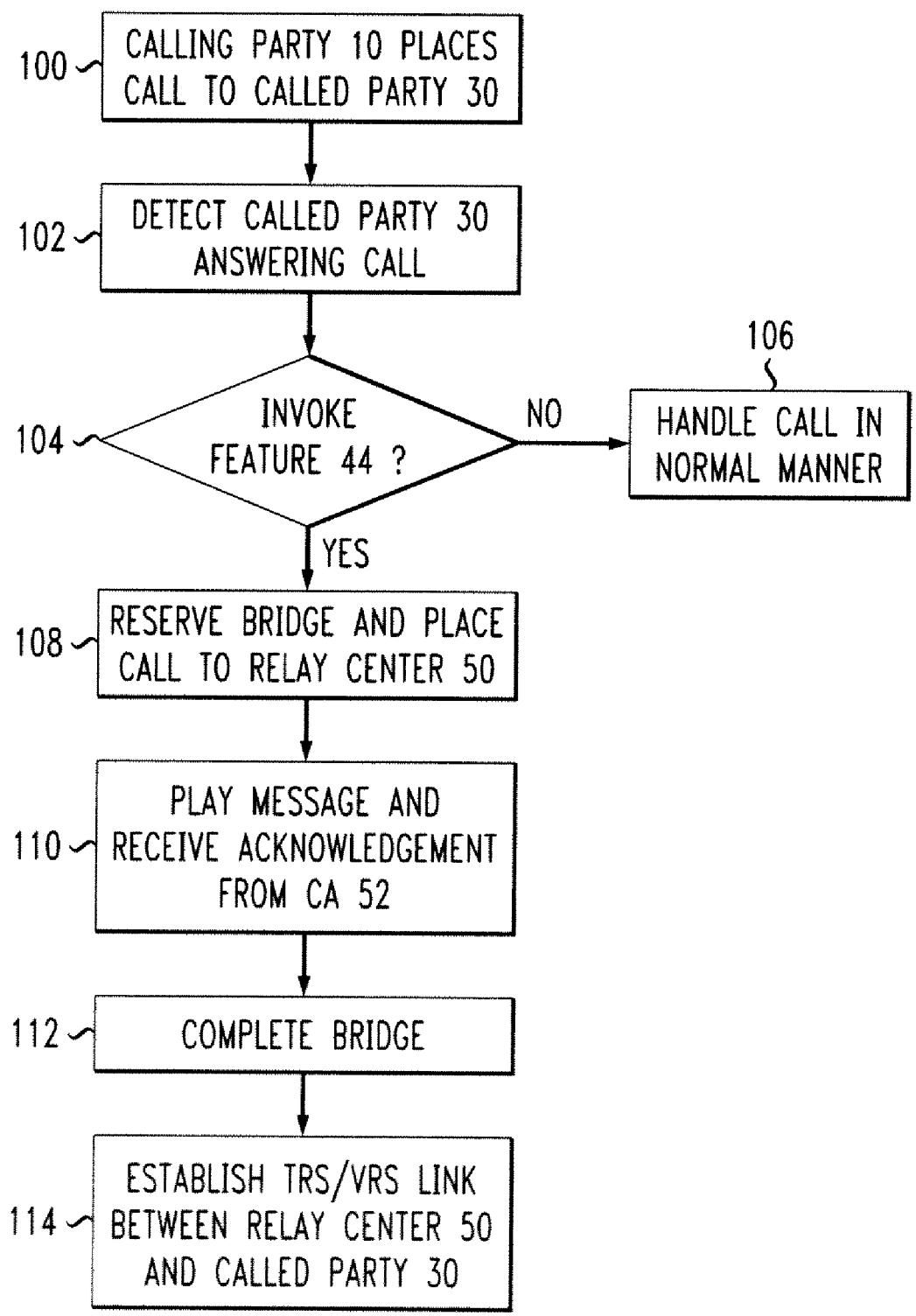
FIG. 2 is flow chart showing an exemplary process suitable for practicing aspects of the present inventive subject matter.

With additional reference to FIG. 2, an exemplary operation of the feature 44 will now be described.

At step 100, the calling party 10 employs the UE 12 to place a call to the called party 30. Suitably, this is achieved, for example, by the calling party 10 simply dialing or otherwise entering the called party's usual telephone or directory number on their UE 12. Accordingly, the call is routed in the normal manner over the network 20 to the terminating node 40 serving the called party 30, i.e., the node 40 to which the called party's UE 32 is operatively connected.

Upon receiving the call for the called party 30, the node 40 or switch 42 will alert the corresponding UE 32 of the called party 30 in the usual fashion, and at step 102, the node 40 or switch 42 detects the called party 30 answering the call. For example, upon the called party 30 answering the call with the UE 32, the UE 32 will return an off-hook or other similar signal or message to the node 40 or switch 42.

At step 104, it is determine if the feature 44 is to be invoked or triggered for the particular call in question. Suitably, for a called party in general to be able to access or utilize the feature 44, they have to subscribe to the feature 44. Subscription information is optionally maintained in a subscriber database (DB) 46 or other suitable location. The subscription information indicates, e.g., who subscribes to the feature 44 and/or for which subscribers the feature 44 is activated. The subscription information also optionally includes a list of potential calling parties (e.g., identified by telephone number, name, and/or otherwise) for each subscriber. This list may include those calling parties that are excepted from feature invocation (i.e., an exception list), or alternately, those calling parties for which the feature 44 is to be invoked (i.e., an inclusive list). Accordingly, to determine if the feature 44 is to be invoked or triggered, the DB 46 is optionally queried and/or accessed to see if the called party 30 subscribes to the feature 44 and/or to see if the feature 44 is active for the called party 30. Additionally, using automatic number identification (ANI) or a similar service or feature, the telephone number or identity of the calling party 10 is optionally obtained. The identity of the calling party 10 is then able to be cross-referenced against the subscriber's list of potential calling parties in DB 46 to determine if the feature 44 should be invoked or triggered for this particular call. For example, if the subscriber has set-up or designates the list as an "exception" list, then the feature 44 is invoked or triggered for all incoming calls to a subscriber from any identified calling party not on the subscriber's list, or alternately, if the subscriber has set-up or designated the list as an "inclusive" list, then the feature 44 is invoked or triggered for only those incoming calls to the subscriber from an identified calling party on the subscriber's list. Yet another option is to have the feature 44 manually invoked or triggered. For example, the called party 30 may optionally dial or enter a feature code or otherwise select an activating button or depress a key or sequence of keys on the UE 32 to indicate that they wish to invoke the feature 44 for the incoming call that was just answered. Accordingly, the UE 32 will then signal or otherwise send a suitable message to the node 40 or switch 42 to invoke or trigger the feature 44.

If at step 104 it is determined that the feature 44 is not to be invoked or triggered, then the process branches to step 106 and the call is completed and/or otherwise handled in the normal manner. Otherwise, if at step 104 it is determined that the feature is to be invoked or triggered, then the process continues on to step 108.

At step 108, a bridge is reserved and an outgoing call is placed from the node 40 or switch 42 to the telephone or directory number of the relay center 50 serving the called party 30.

At step 110, when the operator or CA 52 at the relay center 50 answers the call placed in step 108, a prerecorded announcement or message is played explaining the service being requested and the privacy treatment desired. For example, the announcement or message may optionally indicate that the feature 44 has been invoked for the called party 30 and that it is requested that the CA 52 join the call clandestinely to provide the called party 30 with TRS or VRS using VCO. Suitably, a message playback or announcement resource 48 provisioned at or accessible by the node 40 and/or switch 42 is utilized to provide the aforementioned announcement or message. Optionally, the CA 52 acknowledges the request by dialing or entering a suitable response code, which then generates a suitable acknowledgement signal and/or message that is returned to the node 40 or switch 42.

At step 112, in response to the returned acknowledgement signal and/or message, the node 40 and/or switch 42 completes the bridge (optionally silently), thereby connecting the CA 52 at the relay center 50 with the calling party 10 so that the CA 52 can hear the calling party's voice communication and translate or convert them to sign language or text as the case may be. Additionally, at step 114, the appropriate connection is established between the CA 52 at the relay center 50 and the called party 30 depending on the particular type of TRS being used. For example, if VRS is being employed in a particular application, then an appropriate video link is suitably established to the called party's UE 32 from the relay center 50 as described above. Alternately, if text-base TRS is being employed in a particular application, then an appropriate connection to the called party's TTY or other like device (e.g., included in the UE 32) is likewise established from the relay center 50. Accordingly, the called party 30 is able to view the sign language provided by the CA 52 or received the text provided by the CA 52—in either case, which correspond to the translated or converted voice communications from the calling party 10. Moreover, since VCO is suitably being utilized in connection with the TRS or VRS being provided, voice communications from the called party 30 are therefore routed to and/or received by the calling party 10. In this manner, the calling party 10 remains unaware that the called party 30 is employing the TRS or VRS assistance or that the CA 52 is privy to the conversation being had by the parties.

It is to be appreciated that in connection with the particular exemplary embodiments presented herein certain structural and/or function features are described as being incorporated in defined elements and/or components. However, it is contemplated that these features may, to the same or similar benefit, also likewise be incorporated in other elements and/or components where appropriate. It is also to be appreciated that different aspects of the exemplary embodiments may be selectively employed as appropriate to achieve other alternate embodiments suited for desired applications, the other alternate embodiments thereby realizing the respective advantages of the aspects incorporated therein.

It is also to be appreciated that particular elements or components described herein may have their functionality suitably implemented via hardware, software, firmware or a combination thereof. Additionally, it is to be appreciated that certain elements described herein as incorporated together may under suitable circumstances be stand-alone elements or otherwise divided. Similarly, a plurality of particular functions described as being carried out by one particular element may be carried out by a plurality of distinct elements acting independently to carry out individual functions, or certain individual functions may be split-up and carried out by a plurality of distinct elements acting in concert. Alternately, some elements or components otherwise described and/or shown herein as distinct from one another may be physically or functionally combined where appropriate.

In short, the present specification has been set forth with reference to preferred embodiments. Obviously, modifications and alterations will occur to others upon reading and understanding the present specification. It is intended that the invention be construed as including all such modifications and alterations insofar as they come within the scope of the appended claims or the equivalents thereof.

What is claimed is:

1. In a telecommunications network, a method of clandestinely providing a transmission relay service (TRS) to a called party, said method comprising:
   (a) receiving a first call from a calling party, said first call being received at a network node serving a called party for which the first call is intended;
   (b) detecting the called party answering the first call;
   (c) determining whether or not to invoke a feature supported by the network node, wherein if it is determined that the feature is to be invoked, then the method further includes:
      (i) reserving a bridge;
      (ii) placing a second call from the network node to a relay center that provides TRS and serves the called party;
      (iii) obtaining an acknowledgement from the relay center after the second call is answered, the acknowledgement indicating an operator at the relay center is ready to participate in the first call; and,
      (iv) in response to obtaining the acknowledgement, completing the reserved bridge to join the first and second calls so the operator can hear voice communications from the calling party and establishing a TRS link between the relay center and the called party so the operator can provide a translation of voice communications from the calling party to the called party;
   wherein the bridge and TRS link enable the called party to speak to the calling party using voice carry over.

2. The method of claim 1, wherein the first call is placed by the calling party dialing a telephone number assigned to the called party.

3. The method of claim 1, wherein steps (i) through (iv) are not carried out if it is determined in (c) that the feature is not to be invoked.

4. The method of claim 1, wherein the TRS includes a video relay service.

5. The method of claim 1, wherein the method further includes playing an announcement to the operator at the relay center after the operator answers the second call, said announcement indicating the purpose for which the relay center is being contacted.

6. The method of claim 1, wherein the determining in (c) includes
   querying a subscriber database to see if the called party subscribes to the feature.

7. The method of claim 1, wherein the determining in (c) includes:
   obtaining an identity of the calling party; and,
   determining to invoke or not invoke the feature based upon the obtained identity.

8. The method of claim 1, wherein the determining in (c) includes:
   obtaining an input from the called party; and,
   determining to invoke or not invoke the feature based upon the obtained input.

9. In a telecommunications network, a system for clandestinely providing a transmission relay service (TRS) to a called party, said system comprising:
   means for receiving a first call from a calling party, said first call being received at a network node serving a called party for which the first call is intended;
   means for detecting the called party answering the first call;
   means for determining whether or not to invoke a feature supported by the network node;
   means for reserving a bridge after determining the feature is to be invoked;
   means for placing a second call from the network node to a relay center that provides TRS and serves the called party after determining the feature is to be invoked;
   means for obtaining an acknowledgement from the relay center after the second call is answered, the acknowledgement indicating an operator at the relay center is ready to participate in the first call;
   means for completing the reserved bridge in response to obtaining the acknowledgement to join the first and second calls so the operator can hear voice communications from the calling party; and,
   means for establishing a TRS link between the relay center and the called party in response to obtaining the acknowledgement so the operator can provide a translation of voice communications from the calling party to the called party;
   wherein the bridge and TRS link enable the called party to speak to the calling party using voice carry over.

10. The system of claim 9, wherein the first call is placed by the calling party dialing a telephone number assigned to the called party.

11. The system of claim 9, wherein the TRS includes a video relay service.

12. The system of claim 9, said system further including means for playing an announcement to the operator at the relay center after the operator answers the second call, said announcement indicating the purpose for which the relay center is being contacted.

13. The system of claim 9, wherein the means for determining further includes
   means for querying a subscriber database to see if the called party subscribes to the feature.

14. The system of claim 9, wherein the means for determining further includes:
   means for obtaining an identity of the calling party, such that determining to invoke or not invoke the feature is based upon the obtained identity.

15. The system of claim 9, wherein the means for determining further includes:
   means for obtaining an input from the called party, such that determining to invoke or not invoke the feature is based upon the obtained input.

16. A method of providing a transmission relay service (TRS) to a called party, comprising:
   a) receiving a first call from a calling party's user equipment (UE) at a network node serving a called party's UE with a directory number specified in the first call;
   b) alerting the called party's UE and detecting when the first call is answered at the called party's UE;
   c) determining a feature is triggered for the first call based at least in part on subscription information associated with the called party;
   d) reserving a bridge;
   e) placing a second call from the network node to a relay center that provides TRS and serves the called party;

f) in response to the second call being answered at the relay center, providing an announcement requesting service from the relay center and a privacy treatment desired in conjunction with the service;

g) joining the first and second calls via the reserved bridge so the operator can hear voice communications from the calling party; and h) establishing a TRS link between the relay center and the called party so the operator can provide a translation of voice communications from the calling party to the called party.

17. The method of claim 15 wherein the bridge and TRS link enable the called party to speak to the calling party using voice carry over.

18. The method of claim 15 wherein the subscription information includes an exception list identifying calling parties that are to be excepted from invocation of the feature and the determining in c) is based at least in part on the calling party for the first call being identified in the exception list.

19. The method of claim 15 wherein the subscription information includes an inclusive list identifying calling parties for which the feature is to be invoked and the determining in c) is based at least in part on the calling party for the first call being identified in the inclusive list.

20. The method of claim 15 wherein the announcement requests the relay center to join the first call via a bridge, requests an operator at the relay center provide TRS to the called party via the TRS link in conjunction with voice carry over between the calling party and the called party, and requests privacy treatment from the relay center such that the calling party is not aware that the relay center is participating.

* * * * *